(12) United States Patent
Correale, Jr.

(10) Patent No.: US 9,193,126 B2
(45) Date of Patent: Nov. 24, 2015

(54) BIOMETRIC READER FOR COMPACTOR/BALER AND METHOD

(71) Applicant: PTR Baler and Compactor Company, Philadelphia, PA (US)

(72) Inventor: Edward Howard Correale, Jr., Levittown, PA (US)

(73) Assignee: PTR Baler and Compactor Company, Philadelphia, PA (US)

( * ) Notice: Subject to any disclaimer, the term of this patent is extended or adjusted under 35 U.S.C. 154(b) by 93 days.

(21) Appl. No.: 13/764,339

(22) Filed: Feb. 11, 2013

(65) Prior Publication Data
US 2013/0145938 A1    Jun. 13, 2013

Related U.S. Application Data

(62) Division of application No. 13/303,770, filed on Nov. 23, 2011, now Pat. No. 8,371,214.

(51) Int. Cl.
*B30B 13/00*    (2006.01)
*B30B 15/26*    (2006.01)
(Continued)

(52) U.S. Cl.
CPC ............... *B30B 15/00* (2013.01); *B30B 9/3007* (2013.01); *B30B 9/3032* (2013.01); *B30B 13/00* (2013.01); *B30B 15/26* (2013.01); *F16P 3/08* (2013.01)

(58) Field of Classification Search
CPC .... B30B 9/3007; B30B 9/3032; B30B 13/00; B30B 15/14; B30B 15/26; B30B 15/00; G07C 9/00563; F16P 3/08
USPC ........... 100/35, 43, 45, 48, 99, 341, 345, 347, 100/226, 229 R, 245, 265; 340/5.2, 5.22, 340/5.52, 5.53, 5.54
See application file for complete search history.

(56) References Cited

U.S. PATENT DOCUMENTS 3,901,541 A    8/1975    Peterson
4,121,515 A    10/1978    Tea
(Continued)

OTHER PUBLICATIONS

PTR Baler and Compactor Company:"Self-Contained Compactors", website; printout from website: http://www.ptrco.com/pr__co__self. php, printout date: Dec. 5, 2011, original web posting date and product availability date: unknown, 2 pages.
(Continued)

*Primary Examiner* — Jimmy T Nguyen
(74) *Attorney, Agent, or Firm* — Panitch Schwarze Belisario & Nadel LLP

(57) ABSTRACT

A compactor/baler for compacting materials includes a frame defining a compacting chamber, a platen movably mounted to the frame, a loading gate movably mounted to the frame and a control panel including a biometric reader having a biometric scanner. The platen is movable within the compacting chamber and the loading gate is movable from a closed position blocking access to the compacting chamber and an open position exposing the compacting chamber. The control panel is actuable between a locked configuration and an operational configuration. The biometric reader is designed to accept a biometric attribute of a user and to actuate the controller between the locked and operational configurations. The biometric reader actuates the controller to the operational configuration if the biometric attribute matches a stored biometric attribute. The control panel prevents the loading gate from moving to the open position when the controller is in the locked configuration.

4 Claims, 8 Drawing Sheets

(51) Int. Cl.
*B30B 15/00* (2006.01)
*F16P 3/08* (2006.01)
*B30B 9/30* (2006.01)

(56) References Cited

U.S. PATENT DOCUMENTS

| | | | | |
|---|---|---|---|---|
| 4,232,599 | A * | 11/1980 | Ulrich | 100/25 |
| 5,517,908 | A | 5/1996 | Stout | |
| 5,685,219 | A | 11/1997 | Schwelling | |
| 5,970,640 | A * | 10/1999 | Farrow | 40/638 |
| 6,055,902 | A | 5/2000 | Harrop et al. | |
| 6,100,811 | A * | 8/2000 | Hsu et al. | 340/5.83 |
| 6,167,803 | B1 | 1/2001 | Schwelling | |
| 6,484,260 | B1 * | 11/2002 | Scott et al. | 713/186 |
| 6,742,448 | B1 | 6/2004 | Davis et al. | |
| 7,102,486 | B2 | 9/2006 | Yamagishi | |
| 7,201,100 | B1 | 4/2007 | Davis et al. | |
| 7,493,854 | B2 | 2/2009 | Etherton et al. | |
| 7,908,896 | B1 * | 3/2011 | Olson et al. | 70/278.1 |
| 7,937,669 | B2 | 5/2011 | Zhang et al. | |
| 8,371,214 | B1 * | 2/2013 | Correale, Jr. | 100/48 |
| 2004/0078579 | A1 * | 4/2004 | Osada et al. | 713/186 |
| 2007/0145121 | A1 * | 6/2007 | Dallal et al. | 235/380 |
| 2008/0198021 | A1 | 8/2008 | Flood | |
| 2008/0202357 | A1 * | 8/2008 | Flood | 100/35 |
| 2009/0160606 | A1 * | 6/2009 | Miller et al. | 340/5.54 |
| 2009/0261981 | A1 | 10/2009 | Jones et al. | |
| 2011/0153614 | A1 | 6/2011 | Solomon | |

OTHER PUBLICATIONS

PTR Baler and Compactor; "Self-Contained Compactor"; 4 pages.
PTR Baler and Compactor Company: "Balers", website; website printout from website: http://www.ptrco.com/pr_balers.php, original web posting date and product availability date: unknown, 2 pages.
PTR Baler and Company; "Hydraulic Balers for Dependable, Cost-Saving Waste Management"; 5 pages.
PTR Baler and Compactor Company: "Stationary Compactors", website; http://www.ptrco.com/pr_co_stat.php, printout date: Dec. 5, 2011, original web posting date and product availability date: unknown, 2 pages.
PTR Baler and Compactor Company: "Stationary Compactors"; 4 pages.
PTR Baler and Company, Self-Contained Compactors, Brochure, 1 page.
PTR Baler & Company, "A Model for Every Baling Requirement", Brochure, 1 page.
PTR Baler and Company, "Hydraulic Balers . . . Engineered for Superior Durability and Maximum Safety", Brochure, 1 page.
PTR Baler and Company, "Strength, Safety, Performance", Brochure, 1 page.
PTR Baler and Company, "Vertical Balers for Dependable, Cost-Saving Waste Management", Brochure, 1 page.
PTR Baler and Company, "The PTR Advantage, Pak-Tite (PT) Series Compactors", Brochure, 1 page.

* cited by examiner

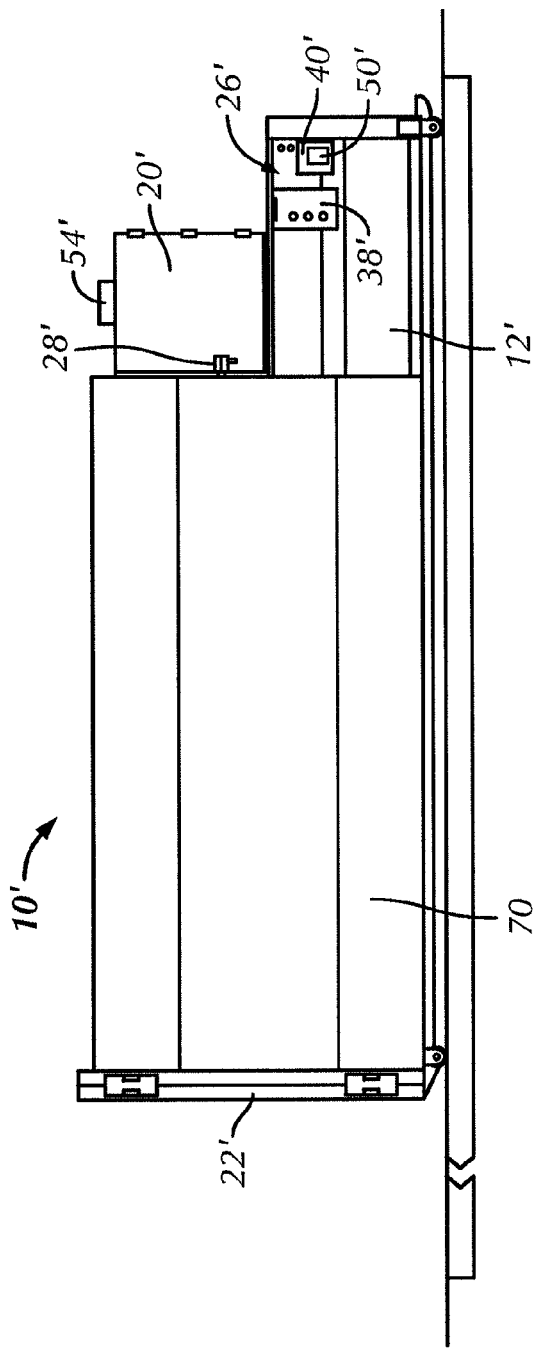
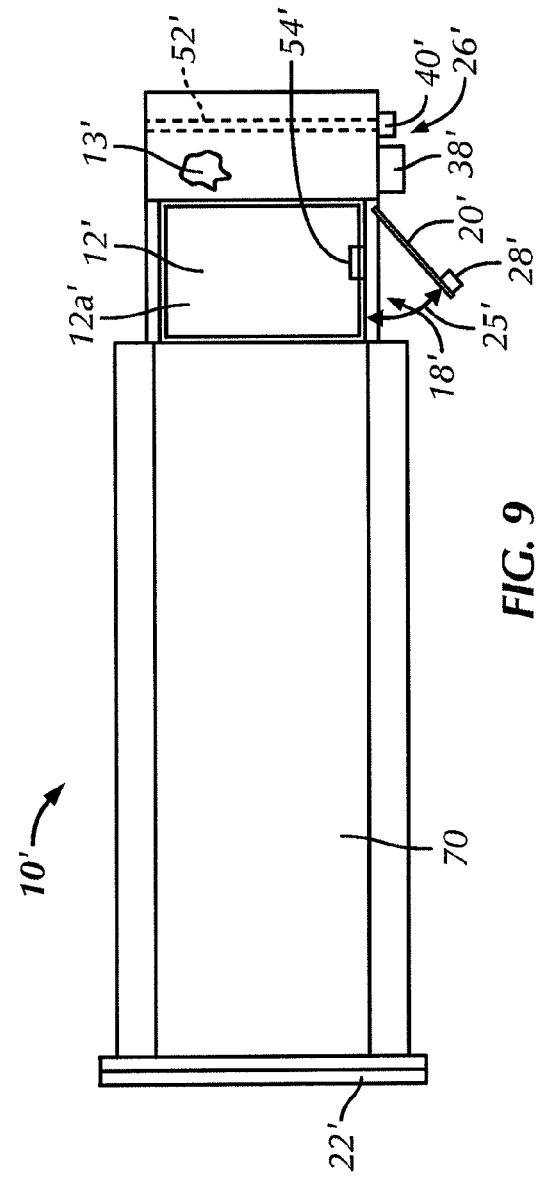
FIG. 8
FIG. 9

BIOMETRIC READER FOR COMPACTOR/BALER AND METHOD

CROSS REFERENCE TO RELATED APPLICATION

This application is a divisional of U.S. patent application Ser. No. 13/303,770 filed Nov. 23, 2011, now U.S. Pat. No. 8,371,214, the disclosure of which is incorporated herein by reference.

BACKGROUND OF THE INVENTION

Commercial balers and/or compactors are machines used to compact materials, typically waste, such as office paper, corrugated fiber board, plastic, packing material, cans or other materials. Commercial balers and compactors are often used by large retailers such as big-box stores, grocery stores or other similar retailers that receive a large amount of packaged inventory for sale or otherwise create a relatively large volume of waste. The packaging, waste and other material created at such stores results in a large amount of waste or other material that must be removed from the store. The commercial balers and compactors are typically utilized by these stores to compact the waste, packaging and other materials into a relatively small, maneuverable volume for disposal and/or recycling.

These commercial balers and compactors are sophisticated and potentially dangerous industrial machines that are preferably only operated by authorized personnel. The commercial balers or compactors operate at high pressures and exert extreme forces to compact the materials into relatively small-sized bales. Certain government regulations prevent employees of a specific age from operating the commercial balers or compactors. In addition, the commercial balers and compactors operate as an exit point from a store where highly valued inventory is received, maintained and distributed and such an exit point is preferably strictly controlled.

Existing balers and compactors include a control panel that may limit operation to authorized users who have a key or an authorization code to enter into the controller to verify that they are authorized to use the machine. However, transferable keys and authorization codes do not consistently prevent unauthorized users from operating the baler, such as when a key is mistakenly or intentionally left in the controller or authorized users share authorization codes with unauthorized users or fellow employees. In addition, controllers for operating commercial balers or compactors often accept specialized codes from individual users to authorize use of the machine. If the controller is damaged, the codes can be lost and all authorized employees can be locked out of the system, thereby necessitating reconfiguration of the system and reauthorization of each user.

It would be desirable to design and develop a commercial baler or compactor wherein authorization to utilize the machine is uniquely personal to the authorized employee such that the machine does not operate unless an authorized user activates the baler or compactor. In addition, it would be desirable to design and construct a commercial baler or compactor wherein an authorized employee may be authorized for use of multiple machines in a single process and damage to a single controller does not result in loss of authorization information by the controller or a group of controllers.

BRIEF SUMMARY OF THE INVENTION

Briefly stated, a preferred embodiment of the present application is directed to a compactor/baler for compacting materials such as packaging, packing materials and waste. The compactor/baler includes a frame defining a compacting chamber, a platen movably mounted to the frame, a loading gate movably mounted to the frame and a control panel including a biometric reader having a biometric scanner. The platen is movable within the compacting chamber. The loading gate is movable from a closed position blocking access to the compacting chamber and an open position exposing the compacting chamber through a loading opening. The control panel is actuable between a locked configuration and an operational configuration. The biometric reader is designed and configured to accept a biometric attribute of a user and to actuate the controller between the locked and operational configurations. The biometric reader actuates the controller to the operational configuration if the biometric attribute matches a stored biometric attribute. The control panel prevents the loading gate from moving to the open position when the controller is in the locked configuration.

In another aspect, a preferred embodiment of the present application is directed to a compactor/baler for compacting materials such as packaging, packing materials and waste. The compactor/baler includes a frame defining a compactor chamber, a platen movable within the compacting chamber and mounted to the frame, a loading gate movable between a closed position blocking a loading opening and an open position exposing the loading opening, a gate locking mechanism including a locking bar, and a fingerprint reader in communication with the gate locking mechanism. The loading opening provides access to the compacting chamber. The loading gate is slideable a long a gate path. The locking bar is movable between a blocking position located at least partially within the gate path and a withdrawn position wherein the locking bar is spaced from the gate path. The locking bar is in the blocking position and the loading gate is in the closed position in a locked configuration. The fingerprint reader actuates the compactor/baler to a loading configuration from the locked configuration only when the fingerprint reader accepts an authorized user's fingerprint and an associated authorization code that corresponds to a stored fingerprint and a stored authorization code. The blocking bar is in the withdrawn position when the compactor/baler is in the loading configuration.

In yet another aspect, a preferred embodiment of the present application is directed to a method for controlling access to a compacting chamber of a compactor/baler. The compactor/baler includes a loading gate, a platen, a compacting chamber, a gate locking mechanism, a fingerprint reader, a proximity sensor, a plurality of associated, stored fingerprints and a stored authorization code. The preferred method includes the steps of orienting the compactor/baler in a locked configuration wherein the loading gate is in a closed position and a gate locking mechanism blocks the loading gate from moving out of the closed position, accepting a user's fingerprint with the fingerprint reader, accepting a user authorization code with the fingerprint reader, comparing the accepted fingerprint and user authorization code to the plurality of associated stored fingerprints and the stored authorization code and actuating the gate locking mechanism to permit the loading gate to move out of the closed position when the fingerprint and authorization code match one of the plurality of associated stored fingerprints and the stored authorization code. The user is notified when the fingerprint and authorization code that were accepted by the fingerprint reader do not match one of the plurality of associated stored fingerprints and the authorization code.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 8 is a side elevational view of a compactor in accordance with a second preferred embodiment of the present application, showing a loading gate or door in a closed position;

FIG. 9 is a top plan view of the compactor of FIG. 8, showing the loading gate or door in an open position.

DETAILED DESCRIPTION OF THE INVENTION

Figure 1:
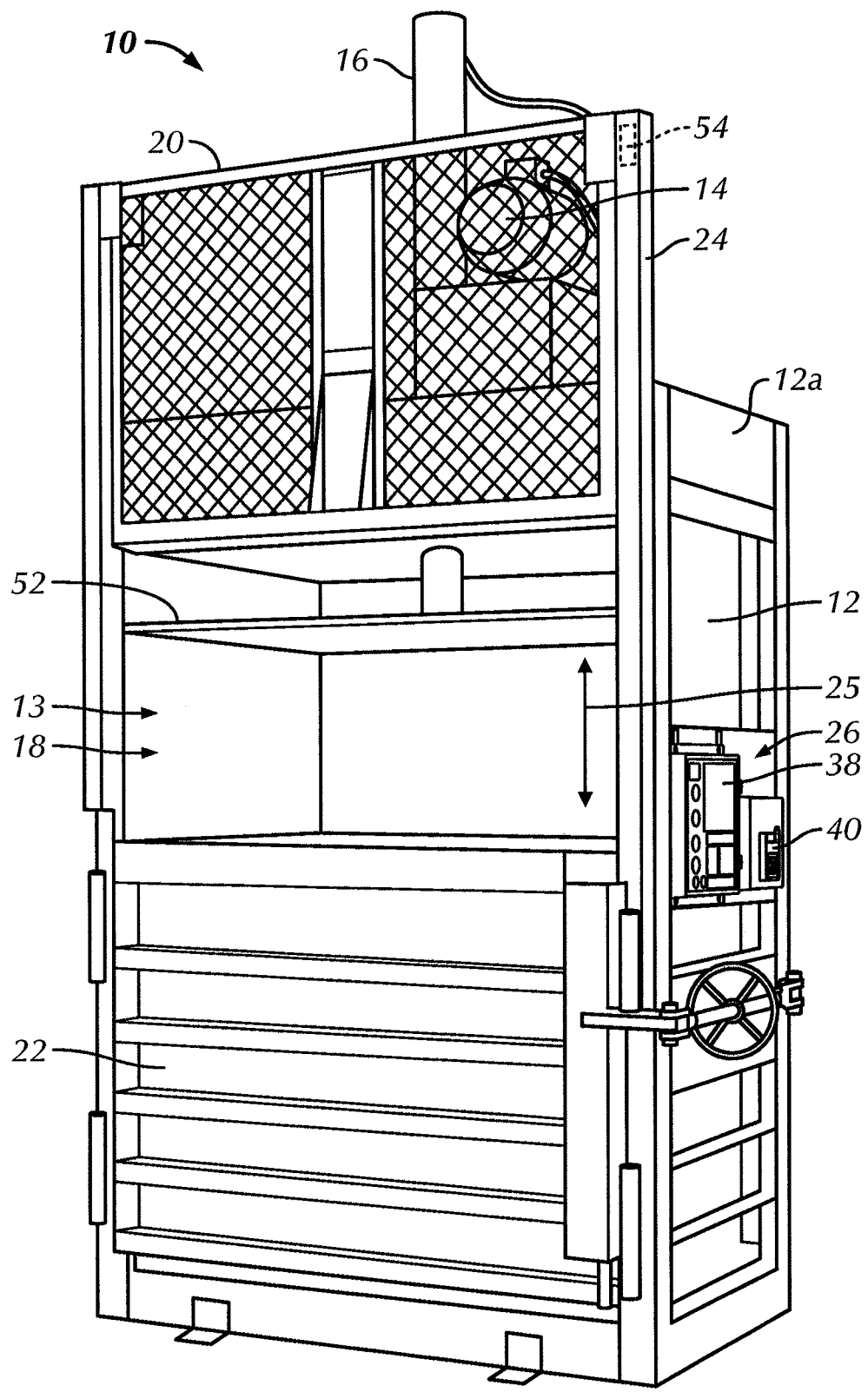
FIG. 1 is a front perspective view of a baler in accordance with a first preferred embodiment of the present application, showing a loading gate in an open position.

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. Unless specifically set forth herein, the terms "a", "an" and "the" are not limited to one element but instead should be read as meaning "at least one". The terminology includes the above-listed words, derivatives thereof and words of similar import.

Referring to FIGS. 1-4, in a first preferred embodiment, the present application is directed to a baler, generally designated with reference numeral 10, for compacting materials such as packaging, packing materials and waste. The first preferred embodiment, shown in FIGS. 1-7 of the present application, is directed to the baler 10. However, the preferred system and method of the present application may be adapted and implemented with a compactor 10', as shown in the second preferred embodiment in FIGS. 8 and 9, or alternative mechanisms that may benefit from the use of a biometric interlock to authorize use of the machine or mechanism. For example, the system and method or components thereof may be adapted for use with a freight elevator or other heavy machinery that may benefit from biometric limitations placed on access to and/or use of the machinery.

The baler 10 of the first preferred embodiment includes a frame 12 that defines a compacting chamber 13 therein. The frame 12 typically includes side and rear walls, a base, a top or roof and a front. The compacting chamber 13 is selectively accessible through a loading gate 20 and/or a chamber door 22. The frame 12 is preferably constructed of a relatively high strength, metallic material such as steel, but is not so limited. The frame 12 may be constructed of nearly any high strength, durable material that is able to take on the general size and shape of the frame 12 and withstand the normal operating conditions of the frame 12. Steel is preferred for the frame 12 due to its high strength, durability and manufacturability.

A platen 52 (FIG. 1) is movably mounted to the frame 12. The platen 52 is movable within the compacting chamber 13 from an initial position proximate the top or roof of the frame 12 to and between a compacting position, generally proximate the chamber door 22. The platen 52 is preferably constructed of a relatively high-strength material and encompasses nearly an entire horizontal cross-section of the compacting chamber 13 to compact an entire layer of material within the compacting chamber 13 during use, as will be described in greater detail below. The platen 52 is preferably driven between the initial and compacting positions by at least a motor 14 and a cylinder or ram 16.

The loading gate 20 is preferably movably mounted to the frame 12 for movement to and between a closed position (FIGS. 2 and 3) and an open position (FIG. 1). The loading gate 20 generally blocks a loading opening 18 in the closed position and permits access to or exposes the compacting chamber 13 through the loading opening 18 in the open position. In the open position, the authorized user may load materials, such as packaging, packing materials, waste and nearly any other material that the authorized user intends to bale or compact, into the compacting chamber 13 through the loading opening 18. In the first preferred embodiment, the loading gate 20 is slideably mounted to the frame on a guide track 24 that guides the loading gate 20 along a generally vertical, linear gate path 25 between the closed and open positions. The loading gate 20 may be constructed of a relatively rigid mesh material or may be semi-transparent such that a user can observe the material within the compacting chamber 13 during use when the loading gate 20 is in the closed position. However, the loading gate 20 is not limited to being semi-transparent or having a mesh construction to facilitate observation and may be opaque, as long as the loading gate 20 generally prevents access to the compacting chamber 13 in the closed position. In addition, the loading gate 20 is not limited to being slideably mounted to the frame 12 and may be pivotably, rotatably or otherwise mounted to the frame 12, as long as the loading gate 20 may be moved to and between the open and closed positions to alternatively expose and block access to the compacting chamber 13.

Figure 2:
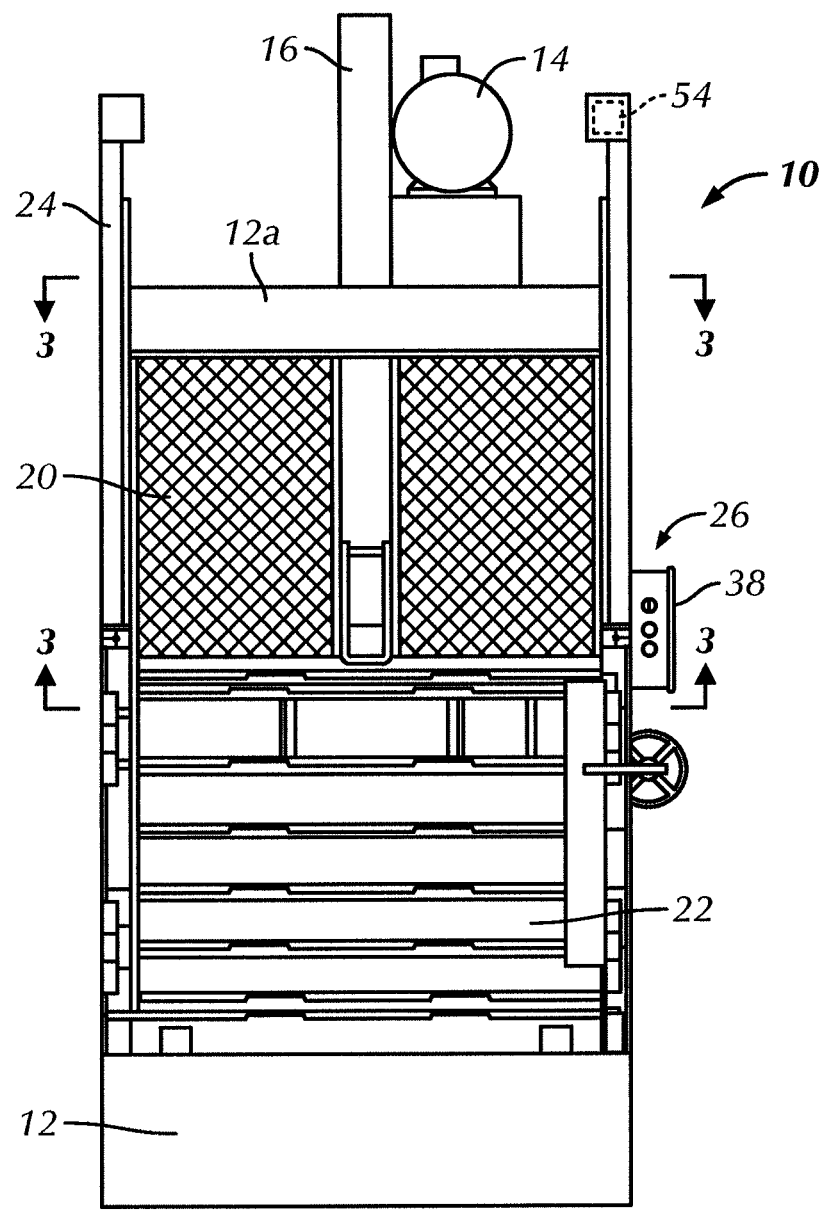
FIG. 2 is a front elevational view of the baler of FIG. 1, showing the loading gate in a closed position.

The chamber door 22 is mounted to the frame 12 and may be moved to an open position (not shown) or locked in a closed position (FIGS. 1 and 2). The chamber door 22 is generally locked in the closed position, but may be opened to remove compacted material or a bale of compacted material from the compacting chamber 13. In the preferred embodiment, the chamber door 22 is pivotably mounted to the frame 12 for pivoting movement from the closed position to the open position to expose and remove the bale from the compacting chamber 13.

Figure 6:
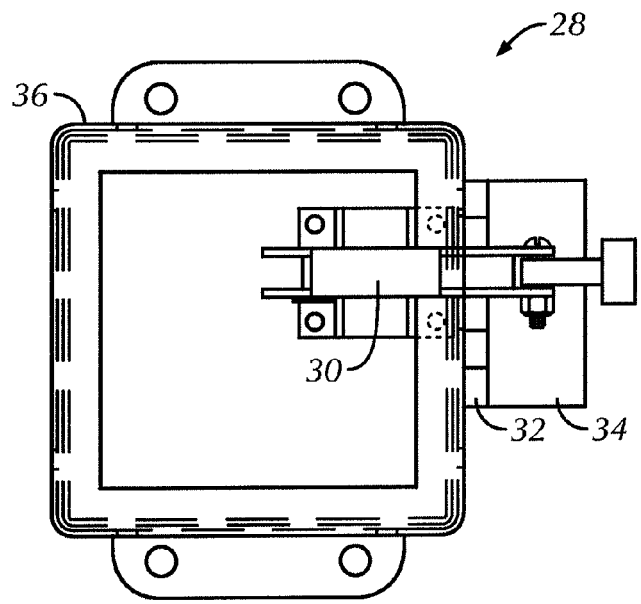
FIG. 6 is a top plan view of the gate locking mechanism of FIG. 3A.
Figure 7:
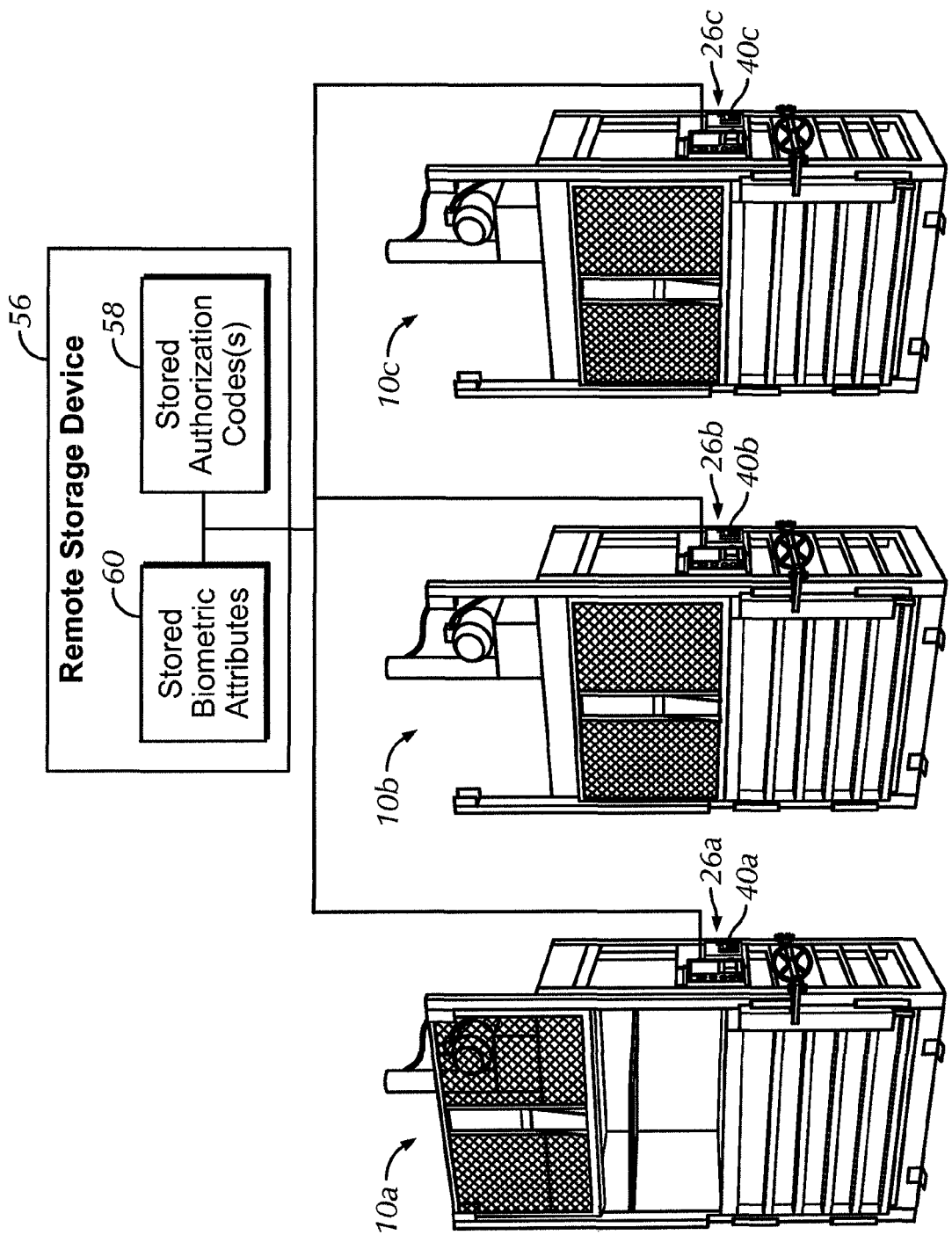
FIG. 7 is a front perspective view of a plurality of balers in accordance with the preferred baler of FIG. 1.
Figure 10:
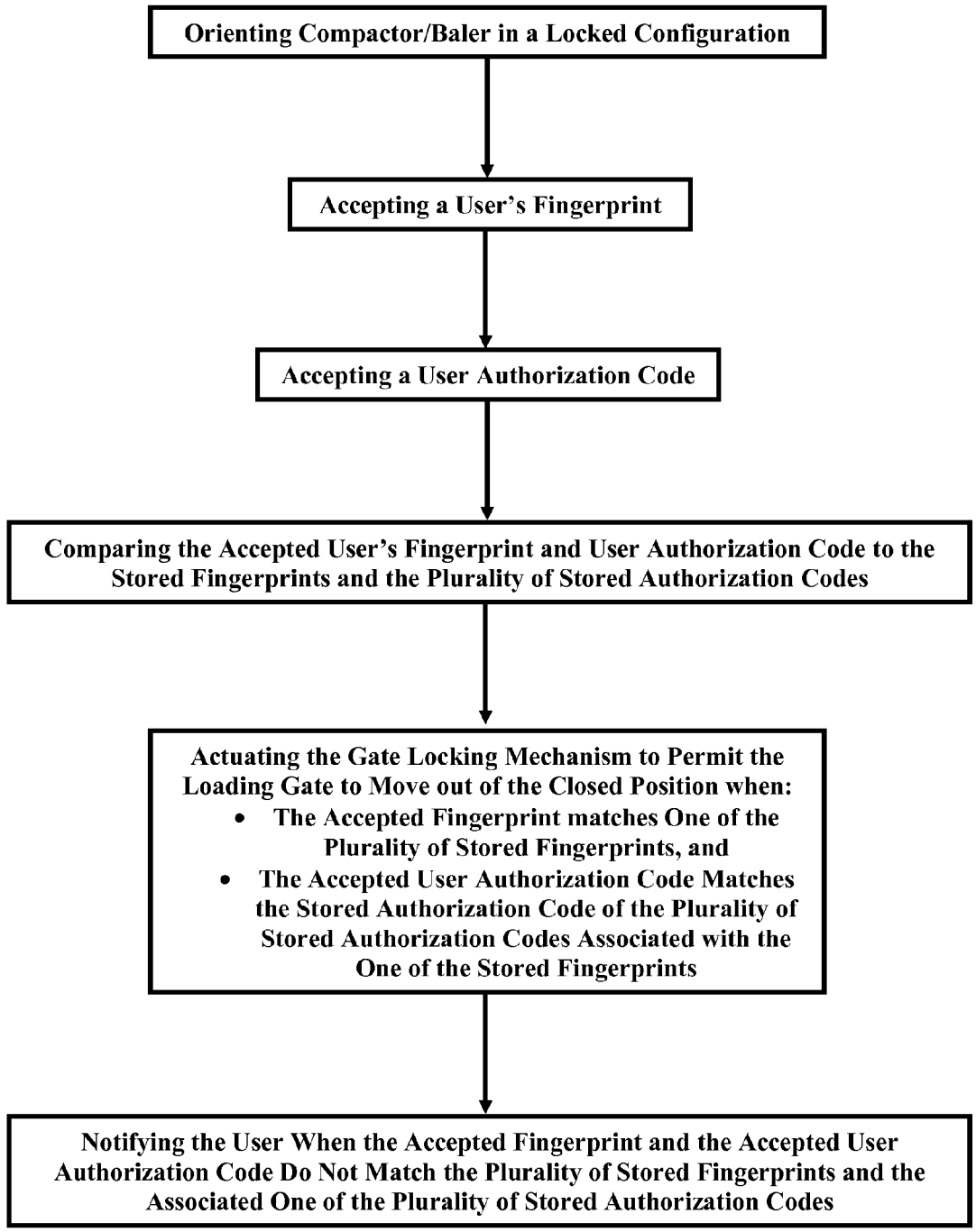
FIG. 10 is a block diagram of steps of utilizing the baler of FIG. 1.

Referring to FIGS. 1-7, the preferred baler 10 also includes a control panel 26 mounted to the frame 12. The control panel 26 is utilized by a user to operate or authorize use of the baler 10. The preferred control panel 26 includes a controller 38 and a biometric reader 40. The biometric reader 40 is comprised of a fingerprint reader 40 in the preferred embodiment, but is not so limited. The biometric reader 40 preferably includes a biometric scanner 46, such as a preferred fingerprint scanner 46, for accepting and/or reading a biometric attribute of a potential user. The biometric reader 40 also preferably includes an LCD display 42, a left LED 48a, a right LED 48d and a keypad 50. The preferred biometric reader 40 is utilized to lock the controller 38 in a locked configuration to generally prevent use of the controller 38 and/or opening movement of the loading gate 20. In the locked configuration, the biometric reader 40 prevents operation of the controller 38 and preferably prevents the loading gate 20 from moving out of the closed position. However, the biometric reader 40 is not limited to preventing the loading gate 20 from moving out of the closed position until actuated and may only lock the controller 38, thereby preventing compacting of waste, until an authorized user actuated the biometric reader 40. In a preferred operational configuration, the biometric reader 40 permits movement of the loading gate 20, generally from the closed position to the open position and prevents use of the controller 38 when the loading gate 20 is in the open position. The potential user activates the controller 38 via the biometric reader 40 by supplying a personal biometric attribute to the biometric reader 40 and an authorization code that may be unique to the user, for example, by entering the unique authorization code into the keypad 50. The biometric reader 40 actuates the controller 38 to the operational configuration if the accepted biometric attribute matches a stored biometric attribute 60 (FIG. 7). In addition, the biometric reader 40 of the preferred embodiment prevents the loading gate 20 from moving to the open position when the controller 38 is in the locked configuration.

In the first preferred embodiment, the stored biometric attribute 60 is comprised of a plurality of stored fingerprints of authorized users that may be stored by the fingerprint reader 40, the controller 38 or an alternative storage mechanism that may be associated with the control panel 26 or may be located remotely from the baler 10, such as a remote storage device 56. The stored biometric attribute 60 is not limited to stored fingerprints of authorized users and may be comprised of a single or a plurality of nearly any biometric attribute that is personal to a potential user and may be accepted by the biometric reader 40, such as palm prints, eye scans or other biometric features that are personal to the potential user. The biometric reader 40 preferably actuates the controller 38 to the operational configuration only if the accepted fingerprint of the authorized user and an authorization code accepted by the keypad 50 match one of the plurality of stored fingerprints or other biometric attribute 60 and a counterpart stored authorization code 58.

Figure 3:
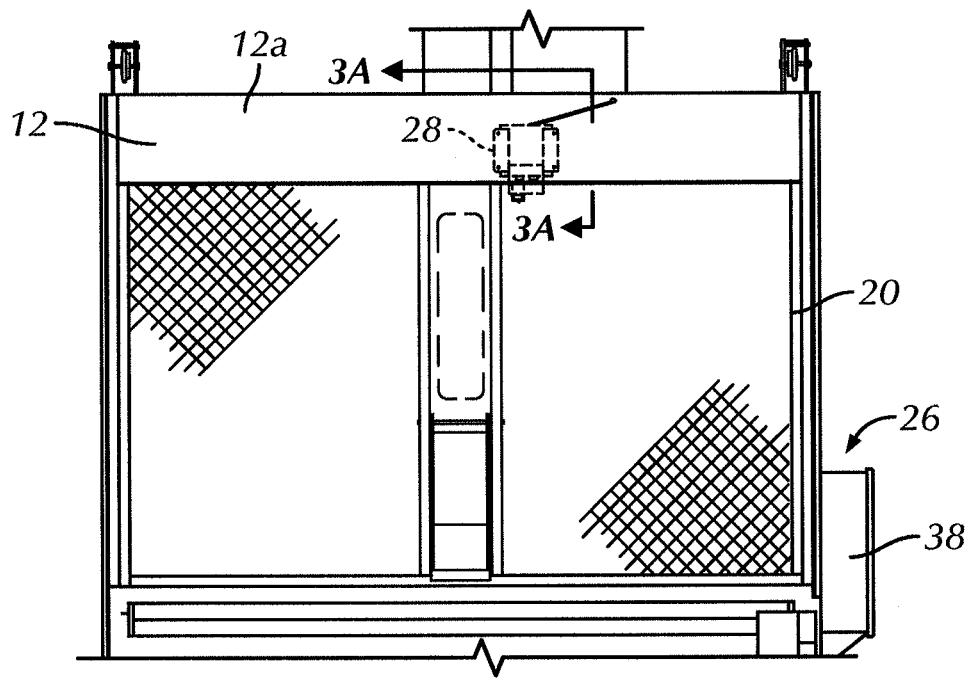
FIG. 3 is a front elevational, partial fragmentary view of the baler of FIG. 1, taken between reference lines 3-3 and 3-3 of FIG. 2.
Figure 3A:
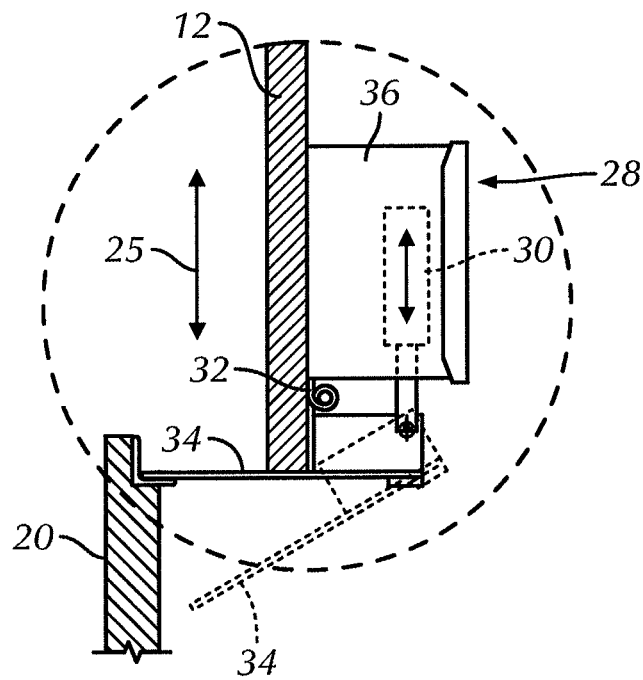
FIG. 3A is a cross-sectional view of a portion of the baler of FIG. 1, taken along line 3A-3A of FIG. 3, showing a side elevational view of a gate locking mechanism of the baler of FIG. 1.
Figure 4:
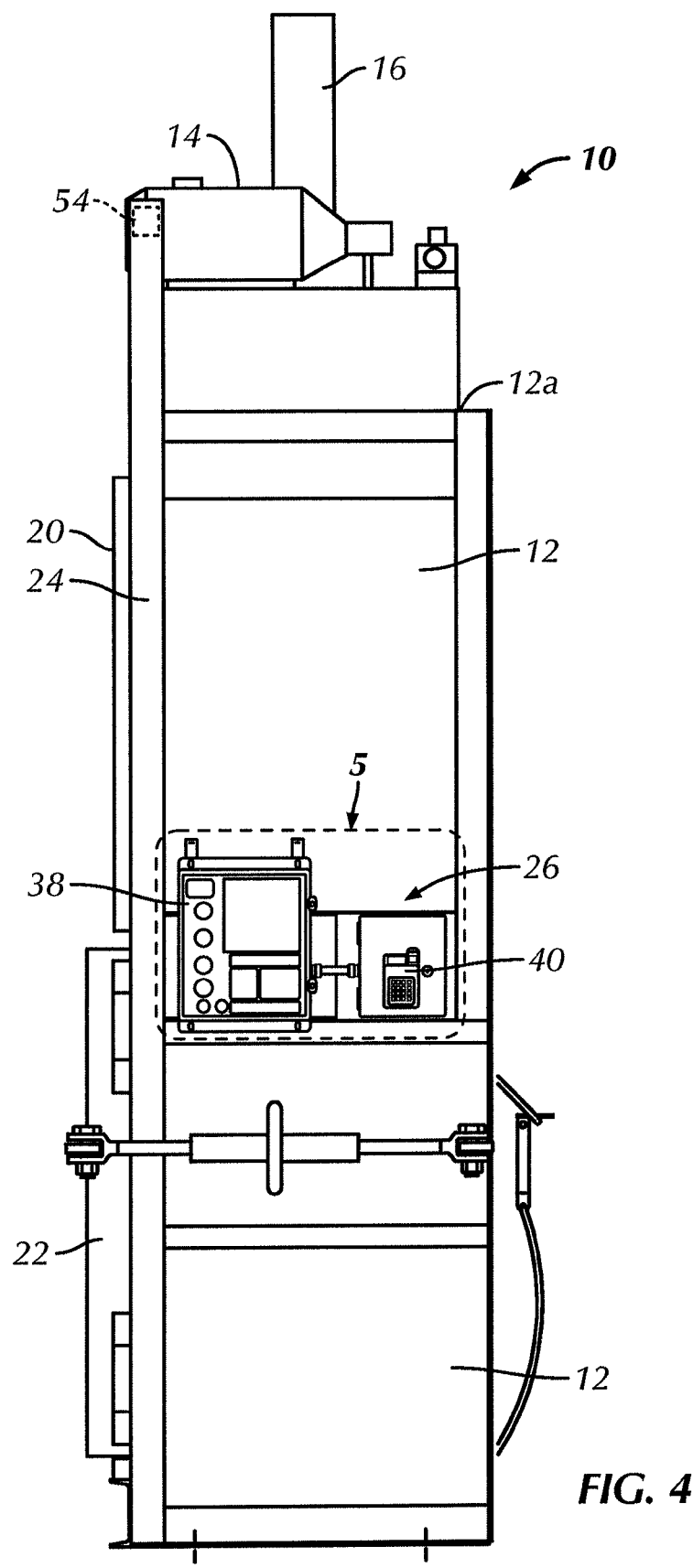
FIG. 4 is a left-side elevational view of the baler of FIG. 1.
Figure 5:
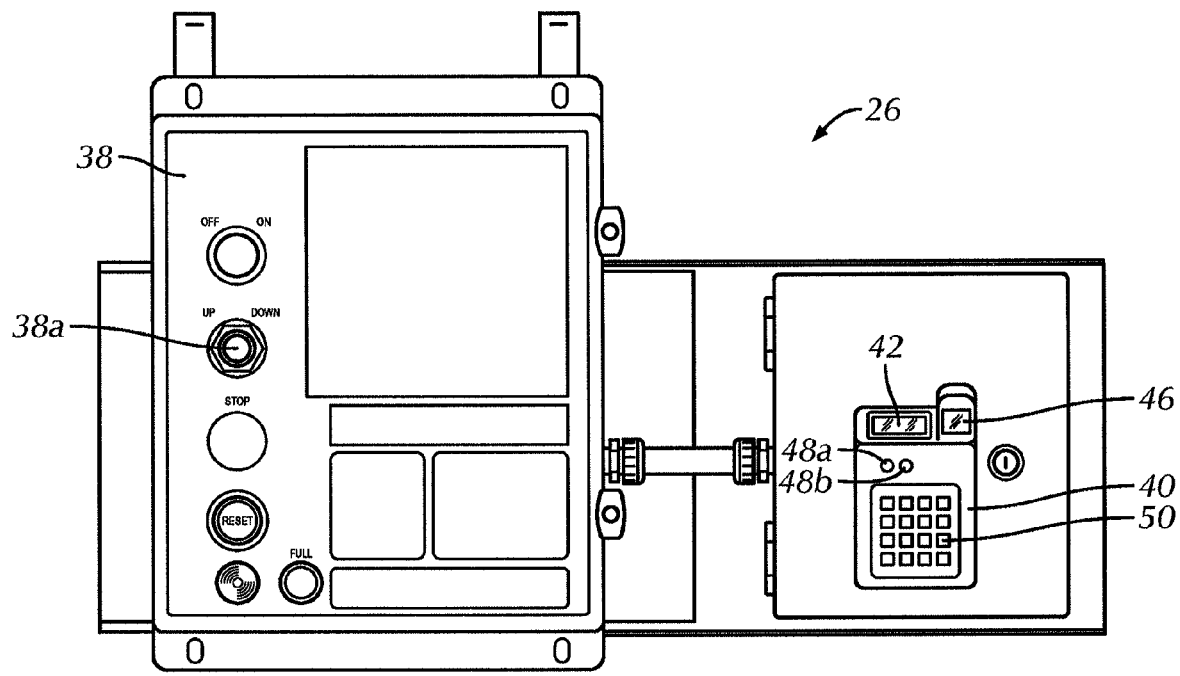
FIG. 5 is a magnified left-side elevational view of a control panel of the baler of FIG. 1, taken from within rectangle 5 of FIG. 4.

Referring to FIGS. 1-6, the preferred baler 10 also includes a loading gate lock or gate locking mechanism 28 mounted to the frame 12. The loading gate lock 28 preferably blocks or locks the loading gate 20 in the closed position to prevent access to the compacting chamber 13 when the baler 10 is not in use and when the baler 10 is operating to compact material. The loading gate lock 28 preferably includes a solenoid 30, a hinge 32, a blocking plate or locking bar 34 and a housing 36. The loading gate lock or gate locking mechanism 28 is in communication with the biometric reader or fingerprint reader 40 to actuate the blocking plate 34. The blocking plate or locking bar 34 is biased to a blocking position wherein it extends at least partially into the gate path 25 to lock the loading gate 20 in the closed position. Upon actuation from the locked configuration to the operational configuration, the solenoid 30 is actuated to move or pivot the blocking plate 34 about the hinge 32 to a withdrawn position (shown in dashed in FIG. 3A). In the withdrawn position, the blocking plate or locking bar 34 is located out of or spaced from the gate path 25, thereby permitting the loading gate 20 to move from the closed position to the open position. When the loading gate 20 is moved to the open position, the authorized user may load materials into the compacting chamber 13 through the loading opening 18.

In the first preferred embodiment, the loading gate lock 28 is not limited to the above-described configuration including the solenoid 30, hinge 32 and blocking plate 34 and may be comprised of nearly any variety of lock that is in communication with control panel 26 to selectively lock the loading gate 20 in the closed position and permit movement of the loading gate 20 toward or into the open position. The loading gate lock 28 may be comprised of an electronically actuable bolt, a magnetic lock, a clamp lock or nearly any variety of lock that permits alternative locking and unlocking of the loading gate 20. The blocking plate or bar 34 is not necessarily limited to a physical bar and/or plate and may be comprised of other locks, such as the lock mechanism, such as the lock created by the magnetic lock. In addition, the baler 10 of the first preferred embodiment is not limited to inclusion of the loading gate lock 28 and may operate without the loading gate lock 28 by permitting the users to open and/or close the loading gate 20 without actuating the biometric reader 40. In such a configuration, the biometric reader 40 is generally only utilized to prevent an unauthorized user from operating the platen 52 without gaining access to operation of the controller 38 by submitting the associated biometric attribute to the biometric reader 40.

In the operational configuration, the controller 38 is unable to move the platen 52 from the initial position to the compacting position until the authorized user moves the loading gate 20 to the closed position (FIG. 2). While the controller 38 is prevented from moving the platen 52 in the operational configuration, the baler 10 is in a loading configuration. The baler 10 is only actuated to the loading configuration when an authorized user's fingerprint accepted through the fingerprint scanner 46 and an associated authorization code accepted through the keypad 50 correspond to a stored biometric attribute 60, such as stored fingerprint, and a stored authorization code 58. In the loading configuration, the blocking plate or locking bar 34 is in the withdrawn position such that the gate path 25 is not blocked.

In the operational configuration, when the loading gate 20 is moved to the closed position and the gate locking mechanism 28 locks the loading gate 20 in the closed position, the controller 38 may be utilized to bale or compact the loaded material by driving the platen 52 from the initial position to the compacting position by actuating an up/down button 38a. For safety, the up/down button 38a does not operate unless the loading gate 20 is in the closed position and locked in the closed position by the loading gate lock 28. The controller 38 also preferably includes a stop button 38b that may be depressed to stop movement of the platen 52 and withdraw authorization to use the controller 38. After the stop button 38b is depressed, an authorized user preferably must re-authorize the control panel 26 by entering a biometric attribute and authorization code into the biometric reader 40.

In the initial position, the platen 52 is positioned proximate a roof 12a of the frame 12 or compacting chamber 13 and in a compacting position, the platen 42 is position proximate the chamber door 22. The platen 52 may be located at various depths within the compacting chamber 13 in the initial and compacting positions, particularly in the compacting position, where the position of the platen 52 may be dictated by the amount of materials in the compacting chamber 13 and the size of the compacted bale.

Referring to FIG. 7, first, second and third balers 10a, 10b, 10c may be installed at a particular location or at multiple store locations for the same customer. Like reference numerals are utilized to identify like components of the first, second and third balers 10a, 10b, 10c in comparison to the preferred baler 10 shown in FIGS. 1-6, with the references "a", "b" and "c", respectively, used to distinguish the first, second and third balers 10a, 10b, 10c. The first, second and third balers 10a, 10b, 10c include first, second and third control panels 26a, 26b, 26c, respectively. The first, second and third control panels 26a, 26b, 26c are in communication with each other such that authorized users may be authorized to utilize each of the balers 10a, 10b, 10c using a verification process at one of the control panels 26a, 26b, 26c. Such verification would be communicated with the other control panels 26a, 26b, 26c such that the user is authorized to utilize each of the balers 10a, 10b, 10c. This single authorization to utilize multiple balers 10, 10b, 10c simplifies the verification or authorization process for the authorized users. In addition, communication between the control panels 26a, 26b, 26c limits the possibility that verifications are lost if one of the control panels 26a, 26b, 26c malfunctions or is damaged, because the other control panels 26a, 26b, 26c maintain the verifications and may communicate the verifications to the damaged control panel 26a, 26b, 26c upon repair. The verifications or verification information includes the stored biometric attributes 60 and the stored authorization code(s) 58 in the preferred embodiment, but is not so limited and may include additional information that is utilized to verify the identify of authorized users or to support the ability of the balers 10a, 10b, 10c to permit use by authorized users and deny use by unauthorized users.

The first baler 10a may be configured as a master baler 10a and the second and third balers 10b, 10c may be configured as slave balers 10b, 10c. In such a preferred arrangement, the plurality of stored biometric attributes 60 and stored authorization code(s) 58 may be transmitted from the fingerprint reader 40a of the master baler 10a to the fingerprint readers 40c, 40d of the slave balers 10b, 10c. Accordingly, each of the balers 10a, 10b, 10c may store the same stored plurality of biometric attributes 60 and stored authorization code(s) 58, such that an authorized user may utilize each of the balers 10a, 10b, 10c and the individual fingerprint readers 40a, 40b, 40c may be utilized to back each other up. The backup of such information is preferred to limit the possibility of data loss. In addition, an administrator may enter, remove and/or modify information related to authorized users at only the master baler 10a and the changes to the stored plurality of biometric attributes 60 and stored authorization code(s) 58 can be shared by the master baler 10a with the slave balers 10b, 10c.

The master baler 10a may also transmit the stored plurality of biometric attributes 60 and the stored authorization code(s) 58 from the master fingerprint reader 40a to a remote storage device 56. The remote storage device 56 may be utilized to update, remove, add or otherwise manipulate the stored plurality of biometric attributes 60 and stored authorization code(s) 58, monitor usage of the balers 10a, 10b, 10c or otherwise control and monitor the balers 10a, 10b, 10c and control panels 26a, 26b, 26c. The remote storage device 56 may be utilized by management in a corporate or home office to remove, modify or add information, such as stored biometric attributes 60 and stored authorization code(s) 58, such as when an employee leaves or joins the company. The plurality of balers 10a, 10b, 10c are not limited to communicating with the remote storage device 56 or to communication with the other balers 10a, 10b, 10c and the stored plurality of biometric attributes 60, such as fingerprints, and stored authorization code(s) 58 may be stored and manipulated directly from control panels 26a, 26b, 26c.

Referring to FIGS. 1-6, the control panel 26 is preferably configured such that an administrator has the ability to add and/or delete authorized users. To authorize a user at the control panel 26, the administrator activates the control panel 26 by inputting their unique code at the keypad 50 and placing their finger on the fingerprint scanner 46 to verify that the individual is an administrator. The administrator then operates the biometric reader 40 to add an authorized user of the baler 10. The potential authorized user scans their finger on the fingerprint scanner 46 and the biometric reader 40 or control panel 26 provides a specific and unique authorization code to the potential authorized user. The now authorized user subsequently utilizes their fingerprint and specific code to unlock the control panel 26. The biometric reading taken by the biometric reader 40 is not limited exclusively to fingerprints and may be comprised of nearly any biometric feature that is unique to an individual, such as a palm reading, eye scan or other unique biometric feature that may be consistently scanned by the biometric reader 40.

The control panel 26 and biometric reader 40 are utilized to limit the number of authorized users who are able to operate the preferred baler 10. The administrator is able to strictly control the identity and number of authorized users, potentially to comply with government regulations. For example, the administrator may only authorize individuals over a certain age to operate the baler 10 by only adding such employees to the authorized user list. In addition, the control panel 26 is preferably able to communicate with back/office management such that the identities of authorized users can be maintained and their qualifications for use of the baler 10 can be verified. Authorized users may be required to satisfy continuing education requirements for use of the baler 10 or other requirements. Through communication with the control panel 26, the back office management or personnel may automatically cancel authorization for users who do not keep up with their continuing education, authorized users who are dismissed from employment or for nearly any other reason that an authorized user may need to be removed from authority to operate the baler 10. In addition, communication between the back office and the control panel 26 permits tracking of the use of the baler 10, tracking of the authorized users and general tracking of the baler 10, which may be valuable for staffing, inventory or other planning purposes.

Referring to FIG. 7, communication between the control panel 26 and the back office for the multiple control panels 26a, 26b, 26c may be via wired connections or wireless communication between the units. In addition, such communication may be utilized for backup purposes to store information regarding the balers 10a, 10b, 10c, authorized users or other information created via the control panel 26.

Communication between the control panels 26a, 26b, 26c and the back office may also be utilized to estimate inventory and generally control inventory. Unexpected or an inordinate amount of use of the baler 10 may indicate to back office management potential theft or disposal issues occurring at a specific location. For example, authorized users may insert damaged inventory into the baler 10 instead of going through the process to request refunds from the manufacturer, as such refund processes may take significant time and effort from the authorized users. In contrast, compacting the damaged goods to get them out of the facility is significantly quicker and easier for the authorized users.

Referring to FIGS. 1-6, in operation, the authorized user typically brings materials to the location of the baler 10 for compacting or baling. The authorizing user unlocks the baler 10 by manipulating the control panel 26. Specifically, the authorized user enters their unique authorization code on the keypad 50 and places their finger on the fingerprint scanner 46 and the fingerprint reader 40 accepts the user's fingerprint and the user authorization code. The biometric reader or fingerprint reader 40 compares the user fingerprint to the plurality of stored biometric attributes 60 and the accepted authorization code to the stored authorization code(s) 58. If the user's fingerprint matches one of the plurality of stored biometric attributes 60, such as fingerprints, and the accepted authorization code matches the corresponding stored authorization code 58, the fingerprint reader 40 actuates the baler 10 to the loading configuration. If the accepted user fingerprint and one of the plurality of stored biometric attributes 60 are not a match or the accepted authorization code does not match the corresponding stored authorization code 58, the biometric reader 40 refuses to unlock the controller 38 or to actuate the baler 10 to the loading configuration and provides some indication on the LCD display 42 that the controller 38 was not unlocked and the loading gate 20 may not be moved to the open position. In addition, if the accepted fingerprint and authorization code match one of the stored plurality of biometric attributes 60 and the corresponding stored authorization code 58, an authorization is preferably displayed on the LCD display 42 and the baler 10 is actuated to the loading configuration.

Once the authorized user gains access to control the baler 10, the control panel 26 signals the loading gate lock 28 to open. Specifically, in a preferred embodiment, the solenoid 30 is powered to pivot the hinge 32 and move the blocking plate 34 from the blocking position to the withdrawn position out of the gate path 25 of the loading gate 20. The authorized user is able to slide the loading gate 20 from the closed position (FIGS. 1 and 6) to the open position (FIG. 6—shown in dashed line type). With the loading gate 20 in the open position, the materials may be loaded into the compacting chamber 13. The user then moves the loading gate 20 from the open position to the closed position and the control panel 26 actuates the solenoid 30 to move the blocking plate 34 back into the gate path 25.

The user then actuates the controller 38 to drive the ram 16 and platen 52 downwardly to consolidate or compact the material toward the bottom of the compacting chamber 13. The control panel 26 prevents the ram 16 and platen 52 from moving from an initial position near the top of the frame 12 or proximate the loading gate lock 28 toward a compacting position proximate the chamber door 22 to compact the material if the loading gate 20 is not in the closed position. When the platen 52 compacts the materials in the compacting chamber 13 to a predetermined pressure, the platen 52 preferably moves upwardly toward the initial position. When the platen 52 moves past a lower edge of the loading gate 20, the platen 52 may catch the loading gate 20 and move the loading gate 20 toward the open position in preparation for additional loading of materials into the compacting chamber 13, but is not so limited and the loading gate 20 may remain locked in the closed position until moved by a user.

The preferred baler 10 limits the amount of time that the loading gate 20 may be in the open position once the authorized user gains access to the controller 38. For example, the control panel 26 may limit the positioning of the loading gate 20 in the open position to three minutes (3 min.) and sound an alarm if the loading gate 20 is in the open position for longer than three minutes. The positioning of the loading gate 20 may be determined or sensed by a proximity sensor 54 mounted to the frame 12 that communicates with the control panel 26. The proximity sensor 54 is preferably mounted to the frame 12 and/or the guide track 24 to optically, mechanically or otherwise sense the position of the loading gate 20.

The proximity sensor 54 is preferably mounted to the guide track 24 to determine whether the loading gate 20 is positioned in the closed position or the open position. The proximity sensor 54 may be comprised of any number or variety of devices and/or mechanisms that are able to determine whether the loading gate or door 20 is the in open or closed positions, such as a magnetic position sensor, a magnetic interlock, push button switches, optical sensors, mechanical sensors or other mechanisms and/or devices that are able to determine and/or track the position of the loading gate or door 20 and communicate with the control panel 26. The control panel 26 is preferably disabled from operating the platen 52 when the proximity sensor 54 senses that the loading gate 20 is in the open position or in any position other than the closed position. Once the time limit for the loading gate 20 being in the open position is exceeded, the loading gate 20 must be moved to the closed position to stop the warning signal. When the loading gate 20 is moved back to the closed position, the loading gate 20 would again be locked in the closed position by the loading gate lock 28. The authorized user is preferably then required to again gain access to the controller 38 through utilization of the biometric reader 40.

When a bale or predetermined volume of material is compacted in the compacting chamber 13, the authorized user opens the chamber door 22 by unlocking the chamber door 22. The chamber door 22 may be opened to remove the compacted volume of material or bale for disposal and the chamber door 22 is subsequently closed for further use of the baler 10. The biometric reader 40, controller 38 and control panel 26 may be adapted such that the chamber door 22 does not unlock until the biometric attribute is accepted by the biometric reader 40 from the authorized user. However, the chamber door 22 is not limited to being locked until released by the biometric reader 40 and the chamber door 22 may be moved from the open and closed position, regardless of the status of the biometric reader 40 and/or controller 38.

The baler 10 is not limited to sounding a warning after the loading gate 20 has been in the open position for three minutes and the control panel 26 may be customized to provide warnings after the loading gate 20 has been in the open position for nearly any amount of time or to not sound a warning at all based on the positioning of the loading gate 20. In addition, similar warnings may be sounded if the chamber door 22 is open for a predetermined amount of time.

The control panel 26 may also include a key override (not shown) to override the biometric reader 40 if the biometric reader 40 is damaged or malfunctioning. The key override would override the biometric reader 40 permitting the authorized user or management personnel to power the controller 38 without gaining access through the biometric reader 40. The baler 10 preferably operates as long as the key override is in the on position. The management personnel preferably maintains close control of the key override.

The key override is preferably only utilized if the biometric reader 40 must be bypassed, such as if the biometric reader 40 is malfunctioning.

The biometric reader 40 may also be coupled to or retrofit onto existing controllers 10 of known and currently operating balers (not shown). The biometric readers 40 may be mounted to the frame 12 and may communicate with the existing controller 38 to prevent use of the controller 38 unless authorized by the biometric reader 40. Such a retrofit of existing balers permits the above-described safety and control advantages in comparison to existing, prior art balers.

Referring to FIGS. 8 and 9, in a second preferred embodiment, the system of the present application is adapted for use with the compactor 10'. Like reference numerals are utilized to identify like elements of the compactor 10' of the second preferred embodiment in comparison to the baler 10 of the first preferred embodiment with the prime symbol (') used to distinguish the elements or components of the baler 10 of the first preferred embodiment from the similar or like components and/or elements of the compactor 10' of the second preferred embodiment.

The compactor 10' of the second preferred embodiment is shown with its loading gate or door 20' mounted directly to the frame 12'. However, the compactor 10' is not limited to having the door 12 mounted directly to the frame 12' and the loading gate or door 20' may be spaced from the frame 12'. For example, the compactor 10' may be a self-contained compactor 10' positioned outside of a store and the loading gate or door 20' may be mounted to an inner wall of the store with a chute (not shown) extending from the loading opening 18' where waste is loaded into the compacting chamber 13' of the compactor 10'. The door 20', in such a configuration is mounted to an inner wall of the store to limit and/or control access to the compacting chamber 13'.

The compactor 10' of the second preferred embodiment includes a waste container 70' where the compacted waste is stored. The waste is typically introduced into the compacting chamber 13 through the loading opening 18' when the loading gate or door 20' is in the open position (FIG. 9). The platen or ram 52' urges the loaded waste material toward and into the waste container 70. When the waste container 70 becomes full of compacted waste material, the waste container 70 may be removed from its location and transported to a waste facility. Following emptying of the waste container 70, the waste container 70 is returned to the original location for further service. The compactor 10' may be configured such that the waste container 70 is removable from the frame 12' such that only the waste container 70 is transported to the waste facility for disposal of the compacted waste material. Further, the waste may be removed from the waste container 70 prior to transport to the waste facility.

In the second preferred embodiment, the loading gate or door 20' is typically positioned in the closed position, thereby preventing access to the compacting chamber 13' through the loading opening 18'. To gain access to the loading opening 18' and the compacting chamber 13', a user enters their fingerprint or other biometric identifier into the biometric reader 40' via the biometric scanner 46' and their authorization code into the biometric reader 40' via the keypad 50'. The controller 26' compares the accepted biometric identifier and accepted authorization code to the associated stored fingerprints and stored authorization code. If the accepted biometric identifier, preferably the fingerprint, and the stored authorization code match with the accepted fingerprint and authorization code, the loading gate lock 28' releases its lock on the loading gate or door 20', thereby permitting a user to open the loading gate or door 20'.

In the second preferred embodiment, the loading gate lock 28' may be nearly any variety of lock that is in communication with control panel 26' to selectively lock the loading gate or door 20' in the closed position and permit movement of the loading gate or door 20' toward or into the open position. The loading gate lock 28' may be comprised of an electronically actuable bolt, a magnetic lock, a clamp lock or nearly any variety of lock that permits alternative locking and unlocking of the loading gate or door 20'. In addition, the compactor 10' of the second preferred embodiment is not limited to inclusion of the loading gate lock 28' and may operate without the loading gate lock 28' by permitting the users to open and/or close the loading door 20' without actuating the biometric reader 40'. In such a configuration, the biometric reader 40' is generally only utilized to prevent an unauthorized user from operating the platen 52' without gaining access to operation of the controller 38' by submitting the associated biometric attribute to the biometric reader 40' and/or the associated authorization code to the biometric reader 40' through the keypad 50'.

The proximity sensor 54' of the second preferred embodiment is mounted to the roof 12a' of the frame 12' proximate the loading opening 18'. The proximity sensor 54' is in communication with the control panel 26' to indicate whether the loading gate or door 20' is in the open or closed position. The controller 26' preferably only permits the platen 52' to operate when the loading gate or door 20' is in the closed position and the loading gate lock 28' has locked the loading gate or door 20' in the closed position. If the loading gate or door 20' somehow moves out of the closed position while the platen 52' is operating, the controller 26' preferably automatically cuts power to the compactor 10', thereby preventing the platen 52' from further moving within the compacting chamber 13'. In operation, after the use has loaded waste or other material into the compacting chamber 13' and moved the loading gate or door 20' to the closed position, the platen 52' may automatically move toward the compacting position to compact the material. At the conclusion of a compacting stroke, the platen 52' may automatically move back towards its initial position to permit further loading of material into the compacting chamber 13', however, the controller 26' typically does not permit opening of the loading gate or door 20' until the platen 52' moves back to its initial position.

For the convenience and comfort of the authorized users, the control panel 26' is not limited to being mounted to the compactor 10' and may be mounted remotely from the compactor 10', such as to an inside wall of the store or facility where the compactor 10' is located. For example, the control panel 26 may be mounted to the inside wall of a shipping and receiving area of a store proximate the loading gate or door 20', which may also be mounted to the inner wall of the store. Locating the loading gate or door 20' and control panel 26' to an inner wall of the store reduces the need for the authorized users to exit the store to load materials into the compactor 10', thereby avoiding the variable weather conditions an authorized user may encounter when exiting the store. In addition, mounting the loading gate or door 20' and control panel 26' to the inner wall of the store reduces or eliminates the necessity of the authorized user to transport the waste materials out of the store or the storage area for loading into the compactor 10'. The control panel 26' is not limited to being mounted to the frame 12' or the inner wall of the store and may be otherwise located or may be portable such that the user can carry the control panel 26' throughout the facility to operate various balers 10, compactors 10' or other machines.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined by the appended claims.

I claim:

1. A method for controlling access to a compacting chamber of a compactor/baler having a chamber door, a loading gate, a platen, a compacting chamber, a gate locking mechanism, a fingerprint reader, a proximity sensor, a plurality of stored fingerprints and a stored authorization code, the loading gate located above the chamber door, the loading gate movable between a closed position blocking a loading opening and an open position exposing the loading opening, the loading opening providing access to the compacting chamber, the loading gate movable along a gate path, the gate locking mechanism including a locking bar, the gate locking mechanism mounted to a top portion of the frame, the locking bar movable between a blocking position located at least partially within the gate path and a withdrawn position wherein the locking bar is spaced from the gate path, the method comprising the steps of:
- a) orienting the compactor/baler in a locked configuration wherein the loading gate is in the closed position and the gate locking mechanism blocks the loading gate from moving out of the closed position;
- b) accepting a user's fingerprint with the fingerprint reader;
- c) accepting a user authorization code with the fingerprint reader;
- d) comparing the accepted user's fingerprint and user authorization code of steps (b) and (c), respectively, to the plurality of stored fingerprints and the stored authorization code; and
- e) actuating the gate locking mechanism to permit the loading gate to move out of the closed position when the accepted user fingerprint and user authorization code of steps (b) and (c) match one of the plurality of stored fingerprints and the stored authorization code, respectively, and notifying the user when the accepted user fingerprint and user authorization code of steps (b) and (c) do not match one of the plurality of associated stored fingerprints and the stored authorization code.

2. The method of claim 1, wherein the stored authorization code is comprised of a plurality of stored authorization codes, each of the plurality of stored authorization codes associated with one of the plurality of stored fingerprints, the gate locking mechanism actuated in step (e) only when the accepted user fingerprint of step (b) matches one of the plurality of stored fingerprints and the accepted user authorization code of step (c) matches the associated one of the plurality of stored fingerprints.

3. The method of claim 1 comprising the further step of:
- f) transmitting the plurality of stored fingerprints and the stored authorization code from the fingerprint reader to a slave fingerprint reader associated with a slave compactor/baler.

4. The method of claim 1, wherein the fingerprint reader permits the platen to move from an initial position to a compacting position only when the loading gate is in the closed position.

* * * * *